United States Patent
Götz et al.

(10) Patent No.: US 11,153,416 B2
(45) Date of Patent: Oct. 19, 2021

(54) METHOD FOR INDUSTRIAL COMMUNICATION VIA TSN

(71) Applicant: SIEMENS AKTIENGESELLSCHAFT, Munich (DE)

(72) Inventors: Franz-Josef Götz, Heideck (DE); Jürgen Schmitt, Fürth (DE); Thomas Talanis, Heroldsbach (DE); Frank Volkmann, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 657 days.

(21) Appl. No.: 15/779,737

(22) PCT Filed: Nov. 15, 2016

(86) PCT No.: PCT/EP2016/077731
§ 371 (c)(1),
(2) Date: May 29, 2018

(87) PCT Pub. No.: WO2017/093014
PCT Pub. Date: Jun. 8, 2017

(65) Prior Publication Data
US 2020/0322461 A1 Oct. 8, 2020

(30) Foreign Application Priority Data
Nov. 30, 2015 (DE) .................... 10 2015 223 722.2

(51) Int. Cl.
*H04L 29/06* (2006.01)
*G05B 19/418* (2006.01)
*H04L 29/08* (2006.01)

(52) U.S. Cl.
CPC ........ *H04L 69/162* (2013.01); *G05B 19/4185* (2013.01); *H04L 65/608* (2013.01); *H04L 67/26* (2013.01)

(58) Field of Classification Search
CPC ..... H04L 69/162; H04L 65/608; H04L 67/26; G05B 19/4185
See application file for complete search history.

(56) References Cited

U.S. PATENT DOCUMENTS

| | | | | |
|---|---|---|---|---|
| 7,644,172 B2 * | 1/2010 | Stewart | ............... | H04L 65/4092 709/231 |
| 2002/0108121 A1 * | 8/2002 | Alao | ................... | H04L 65/4092 725/110 |

(Continued)

FOREIGN PATENT DOCUMENTS

WO WO 2013/0178270 A1 12/2013

OTHER PUBLICATIONS

Andreas Knoll: TSN soll OPC UA echtzeitfähig machen, XP055334870, Found on the Internet: URL: http://www.elektroniknet.de/markt-technik/automation/tsn-soll-opc-ua-echtzeitfaehig-machen-119445.html [found Jan. 12, 2017] pp. 1-2; 2015.

(Continued)

*Primary Examiner* — Jonathan A Bui
*Assistant Examiner* — Zonghua Du
(74) *Attorney, Agent, or Firm* — Henry M. Feiereisen LLC

(57) ABSTRACT

A method is provided which enables industrial communication via the TSN protocol by means of sockets. Owing to the described method, the possibility of communicating with the socket programming known to the programmer via TSN streams is provided. As a result, simple use of the new TSN quality for simple Internet (IP) programming is possible. Existing applications can easily be expanded for TSN and (Continued)

can therefore benefit from the robustness of TSN in a simple manner. In addition, parallel operation is possible; the same mechanism is always used.

7 Claims, 4 Drawing Sheets

(56) References Cited

U.S. PATENT DOCUMENTS

| | | | | |
|---|---|---|---|---|
| 2003/0163528 | A1* | 8/2003 | Banerjee | H04L 65/4076 709/205 |
| 2004/0230693 | A1 | 11/2004 | Volkmann et al. | |
| 2004/0230694 | A1 | 11/2004 | Volkmann et al. | |
| 2007/0005827 | A1* | 1/2007 | Sarangam | H04L 67/14 710/46 |
| 2010/0093441 | A1* | 4/2010 | Rajaraman | H04L 67/28 463/42 |
| 2013/0007288 | A1* | 1/2013 | Olsen | H04L 65/1069 709/227 |
| 2013/0070788 | A1* | 3/2013 | Deiretsbacher | H04L 29/10 370/466 |
| 2015/0156252 | A1 | 6/2015 | Volkmann et al. | |
| 2015/0365338 | A1* | 12/2015 | Pannell | H04L 49/253 370/412 |
| 2016/0073443 | A1 | 3/2016 | Volkmann et al. | |
| 2016/0197820 | A1 | 7/2016 | Götz | |
| 2017/0048122 | A1 | 2/2017 | Volkmann et al. | |
| 2017/0161122 | A1 | 6/2017 | Volkmann et al. | |
| 2017/0163768 | A1 | 6/2017 | Volkmann et al. | |

OTHER PUBLICATIONS

Anonymus: The benefits of TSN Ethernet for automation networks, XP055334866,Found on the Internet: URL :http://www.controlengeurope.com/article/106735/The-benefits-of-TSN-Ethernet-for- automation-networks.aspx [found Jan. 12, 2017] pp. 1; 2015.

Unknown et al.: "IEEE Standard for a Transport Protocol for Time-Sensitive Applications in Bridged Local Area Networks"; Microprocessor Standards Committee of the IEEE Computer Society; Dec. 7, 2016.

Anonymus: The benefits of TSN Ethernet for automation networks, XP055334866,Gefunden im Internet: URL:http://www.controlengeurope.com/article/106735/The-benefits-of-TSN-Ethernet-for-automation-networks.aspx [gefunden am Jan. 12, 2017] pp. 1; 2015.

Unknown et al.: "Research and Advancement of IEEE802.15.4 Network Based on Time-Sensitive Applications".

Andreas Knoll: TSN soll OPC UA echtzeitfähig machen, XP055334870, Gefunden im Internet:URL:http://www.elektroniknet.de/markt-technik/automation/tsn-soll-opc-ua-echtzeitfaehig-machen-119445.html [gefunden am Jan. 12, 2017] pp. 1-2; 2015.

\* cited by examiner

METHOD FOR INDUSTRIAL COMMUNICATION VIA TSN

CROSS-REFERENCES TO RELATED APPLICATIONS

This application is the U.S. National Stage of International Application No. PCT/EP2016/077731, filed Nov. 15, 2016, which designated the United States and has been published as International Publication No. WO 2017/093014 and which claims the priority of German Patent Application, Serial No. 10 2015 223 722.2, filed Nov. 30, 2015, pursuant to 35 U.S.C. 119(a)-(d).

BACKGROUND OF THE INVENTION

The present invention relates to a method for industrial communication via TSN.

The aim is to specify a method that allows industrial communication using the TSN protocol by means of sockets.

The most widely used way of communicating in networks today is via the IP stack. For this, the applications normally use the well-defined socket interface (BSD sockets, etc.). The flow of communication, in particular with the UDP protocol, is usually effected in these steps:
1.) Create Socket
2.) Bind
3.) Send/Receive
4.) Close Since communication by means of the UDP (user datagram protocol), in contrast to the transport control protocol (TCP), is effected in connectionless, unprotected and directional fashion, additional security measures need to be established by application.

With time sensitive networking (TSN, IEEE 802.1), the standardization organization defines a new network standard at network level 2 that guarantees the quality (QoS, transmission security) in the network in the form of streams. A stream in this context is intended to be understood as a channel on which a talker (also called data source, sender, server, etc.) periodically sends data to one or more listeners (also called data sink, receiver, client, etc.). This new network property of TSN is indispensable for industrial applications and multimedia applications.

A possible solution already being discussed on the standardization committees is depicted in more detail in FIGS. 1 and 2.

FIG. 1 shows the schematic design of a network having an OPC UA client (DC) and a corresponding server, DS, the server providing the desired data to the client DC. The two devices (added only by way of example) are connected to one another by bridges EB1, EB2 in the present case. We subsequently concentrate on the OPC UA server DS, and hence the OPC UA client is also not broken down further. The server contains an application OS managing the data and a network driver ND that makes certain of the communication with the network by means of the respectively desired protocols. The arrows between OPC-TCP and PubSub are used to depict that the communication is possible both via TSN (TSN with API) and via UDP (via Pub/Sub and IP stack), independently of one another. The two communication paths need to be realized separately in the application OS, however.

FIG. 2 depicts the associated flow of data, any UDP and IP sockets required being created separately in this case too and the data transmission being effected separately. Request and response are from the OPC-UA world in this case and depict the querying of the desired process data Data1, Data2.

In the figures too, it is possible to discern the problem that two different disciplines meet that are not easily mappable to one another. The TSN view is very focused on the network and the automatic configuration thereof.

However, the configuration and establishment of the communication by application in TSN is very complex and realized by different APIs (application programming interfaces). These are very difficult for the application level to understand and deal with.

On the other hand, the sockets provide a well-understood standard method for applications to communicate with one another directionally. This comes from the Internet world and is increasingly also being implemented in industrial communication. An example thereof is the OPC-UA (OPC Unified Architecture) protocol.

The two worlds are not compatible today; they exist in parallel beside one another. Applications are in this case written for either one or the other world.

An application wishing to use TSN has to use the different APIs of TSN. If it additionally wishes to communicate via IP, it additionally also needs to support sockets. The mechanism of communication via sockets cannot be used with TSN today.

SUMMARY OF THE INVENTION

It is now the object of the invention to solve this problem and to specify a method that allows communication.

A method is specified by means of which it is possible to map the communication dynamics of TSN streams to UDP socket connections.

Since TSN requires further information (e.g. for reservation), and the establishment phase is executed differently than for UDP, this is not possible directly, however. TSN requires the actual communication (productive phase) to be preceded by establishment of the communication stream taking place (configuration phase). In this case, at least one TSpec is sent from the application to the TSN driver describing the properties of the stream.

DETAILED DESCRIPTION OF PREFERRED EMBODIMENTS

In order to implement the concept, a new communication class is defined in the IP environment (today SOCK_DGRAM (UDP) and SOCK_STREAM (TCP)—this is complemented by SOCK_TS_STREAM (TSN)).

To expand the address structure, a new address family is moreover defined (AF_INET_TS). The address structure then contains not only the IP address but also the stream ID.

Such expansions are provided for in the TCP/IP environment.

Figure 1:
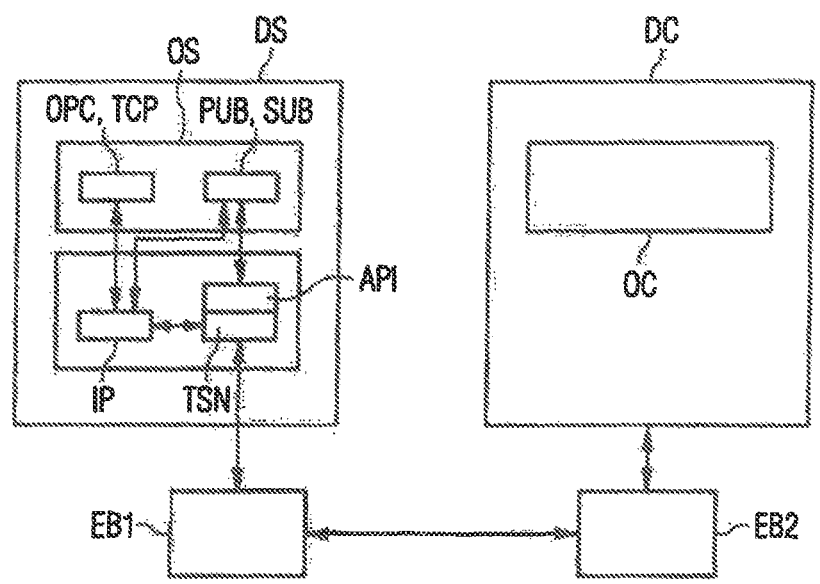
FIG. 1 shows a schematic design of a conventional network having an OPC UA client (DC) and a corresponding server (DS)
Figure 2:
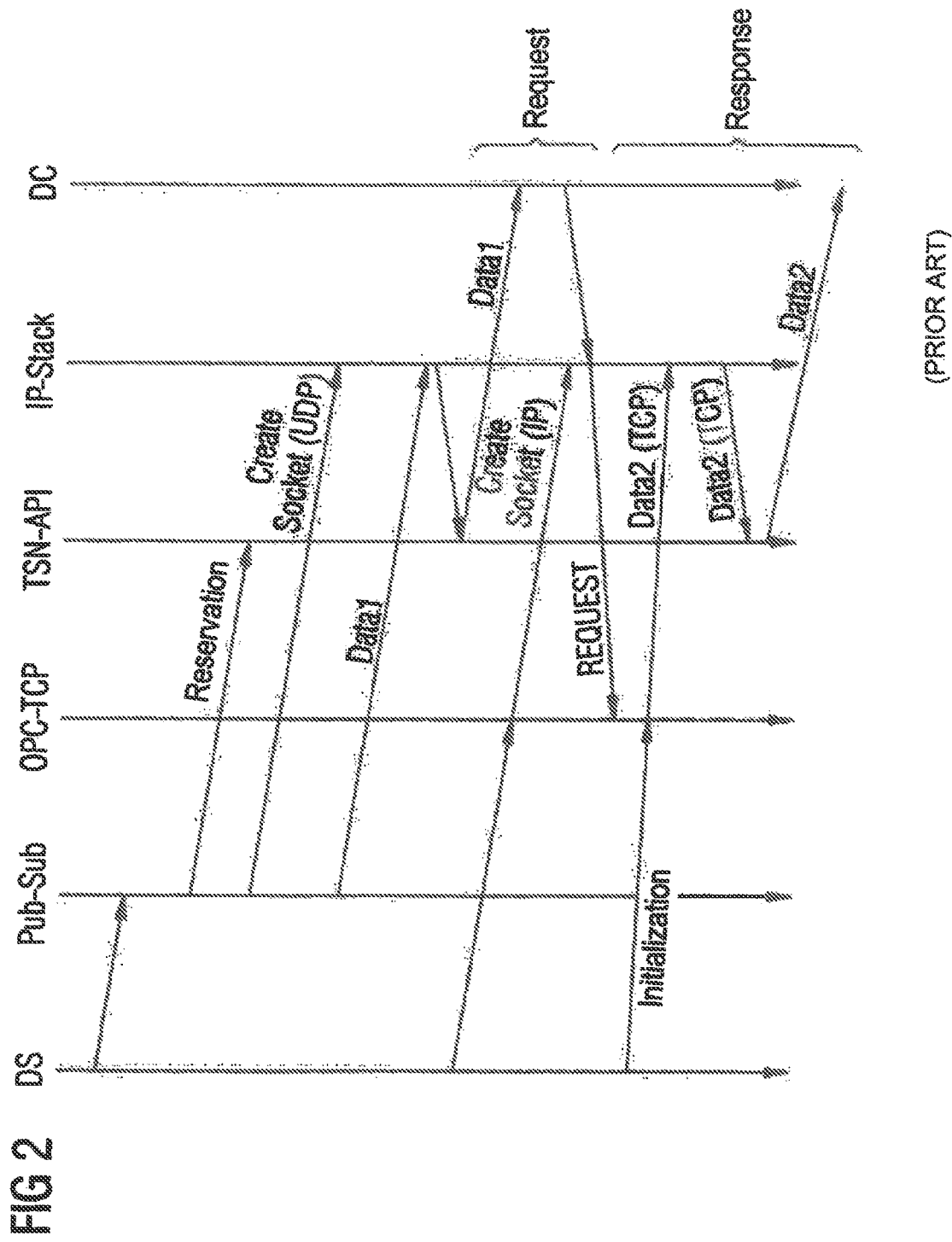
FIG. 2 depicts a data flow associated with the network of FIG. 1.
Figure 3:
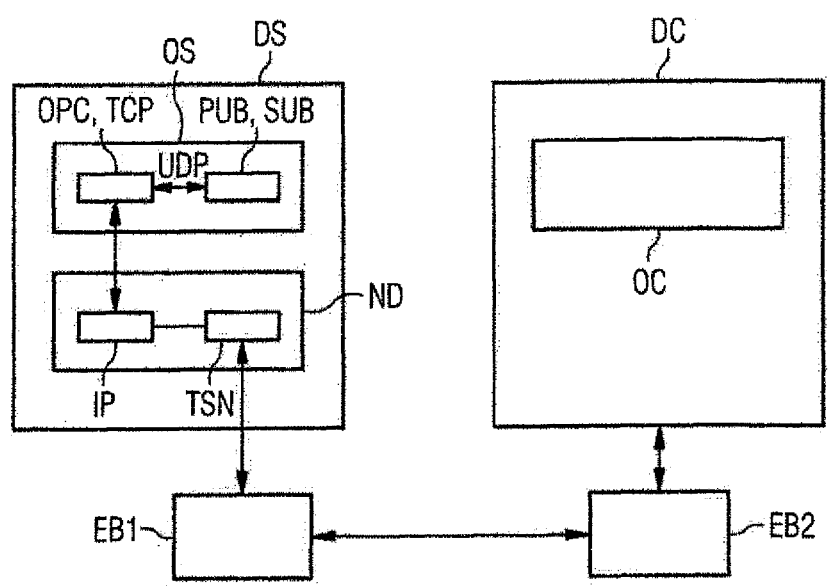
FIG. 3 shows a schematic design of a network according to the present invention.
Figure 4:
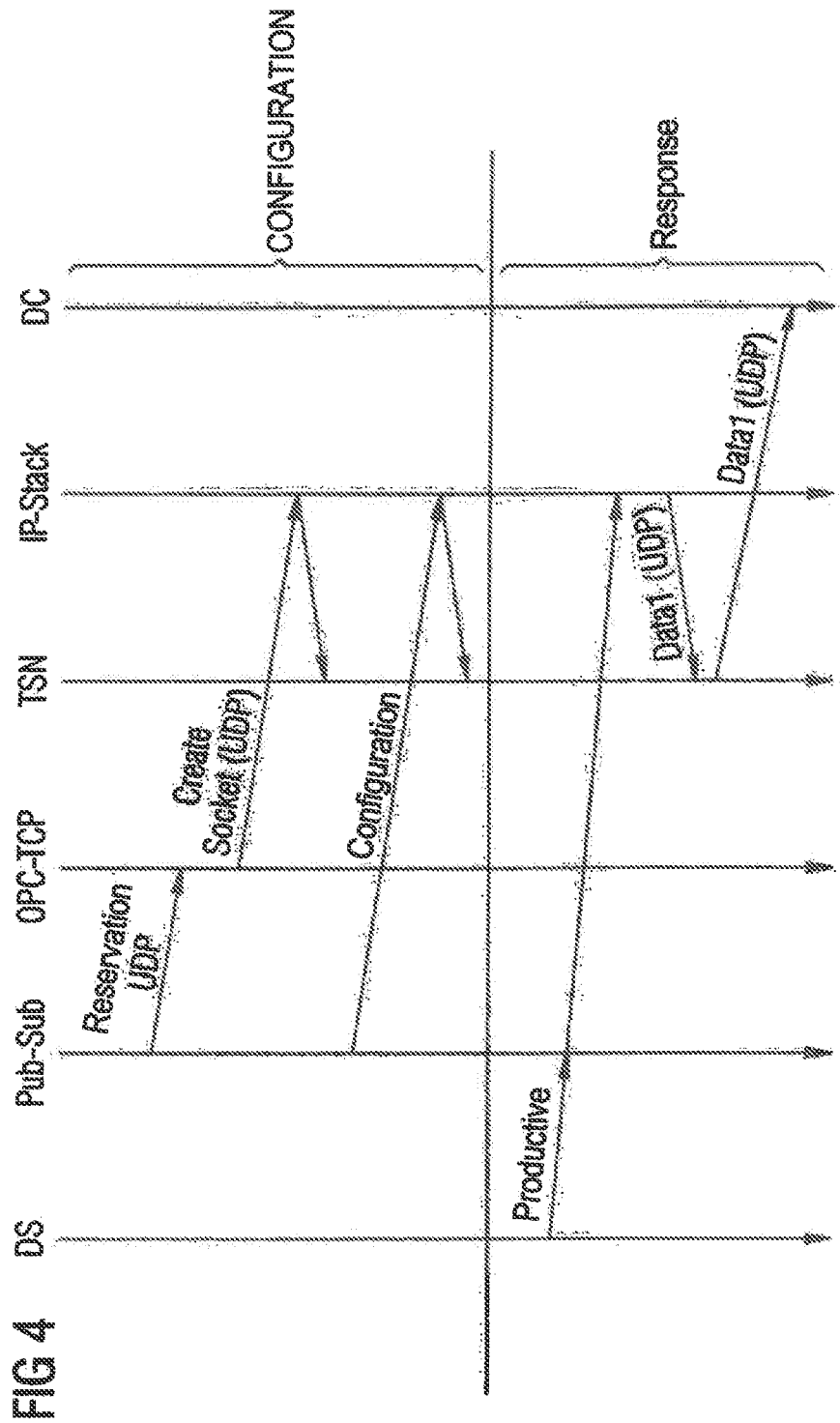
FIG. 4 depicts a data flow associated with the network of FIG. 3.

Establishing the connection at the talker end is depicted by way of example and analogously to FIG. 2 by the flowchart indicated schematically in FIG. 4. The communication, in particular by the network elements DS, PUB-SUB, OPC-TCP, TSN-API, IP stack, DC indicated by arrows, is based on the network design depicted in FIG. 3, analogously to FIG. 1.

An application produces a socket with this new class and the new address family.

socket=socket (AF_INET_TS, SOCK_TS_STREAM, 0)

In the second step, this socket is bound to an address. This binding produces a specific connection to a network card (and hence also to the correct TSN driver in the destination network). The address structure follows the newly defined address family; the stream ID in the structure is 0.

bind (socket, address, address_len)

Hence, the connection between socket OS (application) and network card TSN (TSN driver) is produced.

This special TS_STREAM socket is in the configuration mode; such a mode is not known to UDP.

In the configuration mode, the application sends the reservation parameters (TSpec, etc.) to the socket using the send( ) standard.

Alternatively, the configuration data can also be transferred to the driver using ioctl( ) (via the socket).

The TSN driver evaluates these data. The new TSN stream is established. The TSN driver returns the StreamID it has generated to the application from this new stream via the socket.

The application reads this stream ID from the socket and can send it to potential listeners "out of band" (e.g. via another TCP connection).

Only when one or more listeners link to this stream in the network does the TSN driver send the event of complete establishment of the stream to the application via the socket. As a result, the configuration mode is left and the application begins to cyclically send the user data to the socket (productive mode).

From this mode, there is no way provided to return to the configuration mode. Should this be necessary, this stream needs to be closed and set up afresh.

If faults occur in the productive mode, e.g. all listeners have disconnected, the TSN driver closes the connection. The application therefore knows that there are no further listeners there, or the stream no longer exists for another reason. During the configuration phase, the application can set a timeout for how long the TSN driver maintains the stream if there are no listeners present.

Establishing the connection at the listener end:

The listener is provided with the address having a stream ID as well as an (optional, application-oriented) content description of the stream "out of band" (e.g. via a separate TCP connection).

The listener produces a socket having the same new class as described above.

socket=socket (AF_INET_TS, SOCK_TS_STREAM, 0)

In the second step, this socket is bound to the local address. This binding produces a specific connection to a network card (and hence also to the correct TSN driver in the destination network). The address structure contains not only the IP address but also the stream ID.

The overwritten address structure is denoted by the address family AF_INET_TS.

bind (socket, address, address_len);

After the successful bind, the listener is immediately in the productive mode and awaits the cyclic packets of the talker. Packets from the stream are received by means of RcvFrom( ); the address used for RcvFrom (parameter: src_Adress) is the stream address received via "out-of-band".

recvfrom (socket, buffer, length, flags, src_addr, src_len)

To clarify: a listener will never send to the socket. Communication in the case of TSN is always unidirectional from precisely one talker to any number of listeners.

If the listener wishes to disconnect, he closes the socket. Close(Socket);

The method described provides the possibility of communicating using socket programming, known to the "Internet" programmer, via TSN streams. This allows simple use of the new TSN quality for simple Internet (IP) programming.

Existing applications can be expanded for TSN without great complexity, so that they easily benefit from the robustness of TSN.

Parallel operation is possible "seamlessly"—the same mechanism is always used.

What is claimed is:

1. A method for industrial communication by an application via time-sensitive networking (TSN) from a TSN server to at least one TSN client by means of OPC-UA (Object Linking and Embedding for Process Control-Unified Architecture), the method comprising:
   a) in a configuration phase, establishing a data stream with the following steps:
   creating a socket and setting up a connection of the application to a TCP/IP stack,
   binding the created socket to an address of a TSN driver,
   configuring the connection of the created socket by transmitting reservation parameters from the application to the created socket,
   establishing a TSN stream and setting by means of the TSN driver a StreamID which is returned to the application,
   communicating the StreamID to the at least one TSN client, and
   b) in a productive phase, after the TSN stream is established with at least one receiver in the form of the at least one TSN client, transmitting user data to the at least one TSN client using the socket.

2. The method of claim 1, wherein a separate communication class is used for creating the socket for the TSN and binding the created socket to the address.

3. The method of claim 1, wherein an address structure used for binding the created socket to the address includes an IP address and an identifier for the TSN stream.

4. The method of claim 1, wherein the established TSN stream can be changed only by closing the established TSN stream and freshly setting up a new TSN stream.

5. The method of claim 1, wherein the established TSN stream is closed automatically when a fault occurs or when the at least one TSN client is not connected to the TSN server.

6. The method of claim 1, wherein when the TSN stream is established, a time window is defined that indicates the period after which the established TSN stream is automatically closed when the at least one TSN client is not connected to the TSN server.

7. The method of claim 1, wherein the application comprises Publish-Subscribe (PUB-SUB) messaging.

* * * * *